April 21, 1970   P. G. WILLIAMS   3,507,151
MASS FLOW METER
Filed Aug. 23, 1967

INVENTOR
PETER GILLINGHAM WILLIAMS
BY
Morgan, Finnegan, Durham & Pine
ATTORNEYS

United States Patent Office 3,507,151
Patented Apr. 21, 1970

3,507,151
MASS FLOW METER
Peter Gillingham Williams, Kemsing, Sevenoaks, England, assignor to The British Petroleum Company Limited, London, England, a corporation of England
Filed Aug. 23, 1967, Ser. No. 662,750
Claims priority, application Great Britain, Sept. 14, 1966, 41,080/66
Int. Cl. G01f 3/14
U.S. Cl. 73—240                                8 Claims

ABSTRACT OF THE DISCLOSURE

A piston displacement meter is supported on load cells to weigh fluid in the meter.

Figure 1:
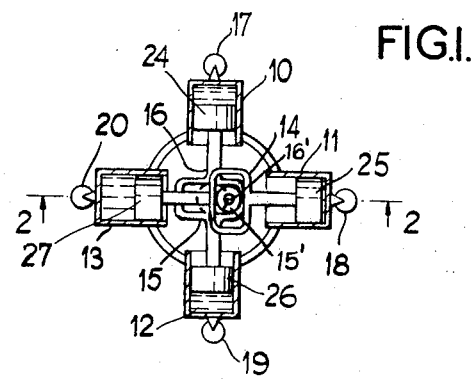

The meter is preferably balanced about a pivot so that the load cells have only to carry the small out of balance load which is due to variation in the density of the fluid.

---

This invention relates to a mass flow meter, that is to a meter which can be connected into a line in which fluid flows and which records the total mass of fluid which passes through the meter.

According to the invention, there is provided a mass flow meter which comprises a plurality of piston-containing cylinders, fluid transfer pipes and a valve assembly. These cylinders, pipes and valve assembly are suitably interconnected for the flow of fluid through the meter, the flow causing displacement of the pistons in the cylinders. The meter is supported partially by a pivot about which the meter is symmetrical and partially by a plurality of load cells operatively associated with the cylinders. The load cells are positioned relative to the cylinders so as to carry the out of balance load of the meter upon displacement of the pistons and thereby measure its displacement about the pivot, whereby the fluid mass contained in each cylinder at maximum displacement can be derived from the out of balance moment at maximum displacement.

The cylinders may conveniently be arranged in symmetrical pairs which are positioned so that the meter as a whole has an axis of symmetry or, more preferably, a point of symmetry about which the meter is pivoted.

In a particularly convenient arrangement a plurality of, preferably two, symmetrical pairs of cylinders are evenly spaced in a circular configuration having the center of symmetry of each symmetrical pair co-incident with the center of the circle which is the center of symmetry of the meter. Preferably the meter has one load cell for each cylinder, said load cells being arranged circumferentially, and all the pistons connected to a common drive arrangement situated at the center of the circle.

When the meter described above is in use, the out of balance moment taken when a piston is at maximum displacement is a measure of the corresponding mass of fluid and summation of these individual mass measurements gives the mass of fluid transferred through the meter. The conversion of measured moments to equivalent mass and the summation of the results is conveniently carried out by means of a computing mechanism connected to the mass flow meter. This invention includes both the mass flow meter alone and the combination of a mass flow meter connected to the computing equipment.

The movement of the oscillating systems, e.g. the pistons, may involve a movement in the center of mass of the meter and compensating systems may be incorporated to eliminate this movement. It is, however, preferred to balance the meter so that there is no net movement of the center of mass of the meter plus fluid when the meter operates on a fluid of standard density.

In the case of a meter which is pivotally mounted it is preferred to balance the meter so that this center of mass is always situated at the pivot, i.e. ideally the meter is balanced so that when pumping a fluid of standard density the load cells always indicate zero moment. This arrangement reduces the load carried by the cells and therefore increases the accuracy of measurement.

Figure 2:
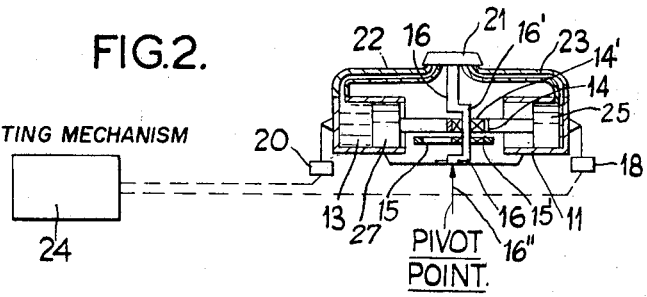
Figure 3:
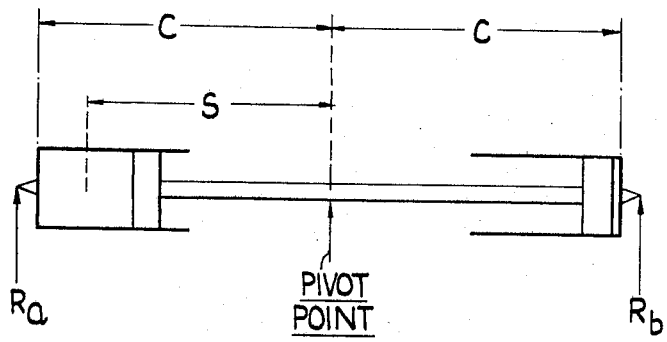

The invention will now be described, by way of example with reference to the drawings in which:

FIGURE 1 is a semi-diagrammatic view in plan with parts in section showing the general layout of the mass flow meter, the meter having two symmetrical pairs of cylinders, FIGURE 2 is a semi-diagrammatic view in sectional elevation taken along the line 2.2 of FIG. 1 and showing the arrangement of a pair of symmetrical cylinders of the meter of FIG. 1 and showing a computing mechanism connected to the meter, and FIGURE 3 is a diagram for explaining the calibration of the instrument.

As can be seen from FIGURE 1 the meter there shown comprises four cylinders 10, 11, 12, and 13, with pistons 24, 25, 26 and 27 respectively, arranged in a cruciform configuration. Cylinders 11 and 13 are a symmetrical pair containing pistons 25 and 27 linked by a yoke-form connecting rod 14 the piston assembly being shown in a maximum displacement position; similarly cylinders 10 and 12 form a symmetrical pair containing pistons 24 and 26 linked by a yoke-form connecting rod 15, the piston assembly being shown in mid-stroke position. The yoke-form connecting rods 14 and 15 both engage through roller cams 14' and 15', respectively, with a crank portion 16" of a central shaft 16 which shaft transfers pumping forces between the pistons as necessary and thereby co-ordinates their movement. This type crankcam drive for a cruciform configuration of opposed pistons is well known and is typified in, for example, French Patent No. 1,240,705 of Aug. 1, 1960.

The meter is partly supported by a central pivot 16" (diagrammatically indicated in FIGURE 2) and partly by load cells 17, 18, 19 and 20 which are situated at the circumferential ends of the cylinders 10, 11, 12 and 13, respectively.

The meter is balanced, as will be explained in greater detail below, so the pivot 16" supports, as far as possible, the entire weight and therefore the load cells have only to carry small out of balance forces. This makes measurement of these forces more accurate and hence improves the accuracy of the meter.

As can be seen from FIGURE 2 the cylinder 13 having piston 27 is connected to a central valve assembly 21 by means of a fluid transfer pipe 22. The cylinder 11 having piston 25 is similarly connected by means of a fluid transfer pipe 23. The cylinders 10 and 12 are each connected in similar manner to the central valve assembly 21 by means of similar fluid transfer pipes, not shown. The central valve assembly 21 is operatively connected to the central shaft 16 which, as it rotates, serves to open and close valves (not shown) in the valve assembly 21. Such valve systems are well known in the art. The shaft 16, in the position shown in FIGURE 2, switches the cylinder 13 from inlet to exhaust and the cylinder 11 from exhaust to inlet. Thus the next step in the sequence of operations is the movement of the piston assembly from right to left with the expulsion through pipe 22 of the fluid contained in cylinder 13 and the acceptance of the new volume in cylinder 11.

As well as operating the valves in the valve assembly 21 the shaft 16 also functions to make electrical connections (not shown) in the assembly 21, of the load cells 20 and 18 to the computing mechanism 24, for the reading of the load cells 20 and 28 when the piston assembly 25, 27 is in the position shown in the drawing. This reading enables the computing mechanism to calculate the mass of fluid contained in the cylinder 13. It will be understood that reading of the load cells 17 and 19 is effected in a similar manner. The computing mechanism sums these individual readings to obtain the total mass throughput of the meter.

Reference will now be made to FIGURE 3 to explain the calibration of the meter. As has been explained above the most accurate results will be achieved if the forces on the load cells are minimised. In most cases a meter is required to work on fluids having a restricted density range and a density towards the center range can be arbitrarily selected as "standard" and the meter balanced for a fluid having this standard density. This means that for all positions of the piston assembly the center of mass of the meter plus fluid of standard density is situated above the pivot.

A general expression relating mass of fluid to load cell reading will now be derived. The following notation will be used:

$M$ = Mass of fluid in cylinder
$V$ = Volume of fluid in cylinder
$d$ = Density of standard fluid
$d+d'$ = Density of fluid in cylinder
$s$ = Distance of center of mass of fluid in the cylinder from the pivot.
$C$ = Distance of each load cell from the pivot
$R_a$ and $R_b$ = Force on each load cell
(Some of these are illustrated in FIGURE 3.)

The mass of fluid in the cylinder is given by:

$$M = V(d+d') = Vd + Vd'$$

The meter is balanced so that the moment of the mass $Vd$ balances the moment of the mass of the meter. Thus the moment measured by the load cells equals the moment of the mass $Vd'$ about the pibot:

$$C(R_a - R_b) = sVd'$$
$$Vd' = \frac{C}{s}(R_a - R_b)$$

and $$M = Vd + \frac{C}{s}(R_a - R_b)$$

Since $V$, $d$, $C$ and $s$ are constants of the instrument the computing mechanism can use this relationship to calculate the mass flow.

Alternatively the relationship is of the form:

$$M = Mo + k(R_a - R_b)$$

and the arbitrary constants $Mo$ and $k$ can be found by calibration.

I claim:
1. A mass flow meter which comprises a plurality of piston-containing cylinders which are interconnected by fluid transfer pipes and a valve assembly in such a manner that, when during use, a fluid is passed through the meter, the flow causes displacement of the pistons in the cylinders, the meter being supported partially by a pivot about which the meter is symmetrical and partially by a plurality of load cells operatively associated with said cylinders, one to each cylinder, which load cells are positioned relative to said cylinders so as to carry the out of balance load of the meter upon displacement of said pistons and thereby measure its moment about the pivot, whereby the fluid mass contained in each cylinder at maximum displacement can be derived from the out of balance moment at maximum displacement.

2. A meter according to claim 1, in which the cylinders are arranged in symmetrical pairs which are positioned so that the meter as a whole has an axis of symmetry about which the meter is pivoted.

3. A meter according to claim 1, in which the cylinders are arranged in symmetrical pairs which are positioned so that the meter as a whole has a point of symmetry about which the meter is pivoted.

4. A meter according to claim 3, in which a plurality of symmetrical pairs of cylinders are evenly spaced in a circular configuration, the center of symmetry of each symmetrical pair being co-incident with the center of the circle which is a center of symmetry of the meter.

5. A meter according to claim 4 which has one load cell for each cylinder, said load cells being arranged circumferentially, and all the pistons connected to a common drive arrangement situated at the center of the circle.

6. A meter according to claim 5, in which there are two symmetrical pairs of cylinders.

7. A meter according to claim 1 in which the meter is balanced for a fluid standard density so that the load cells carry zero load when the meter operates and the fluid is of standard density.

8. A mass flow meter/computing equipment combination which comprises a mass flow meter as claimed in preceding claim 1 operatively linked to computing equipment which is adapted to record each moment at maximum displacement, compute the mass equivalent thereto and to sum said masses to produce a total being the total fluid mass passed through the meter.

References Cited

UNITED STATES PATENTS 1,932,976  10/1933  Lamb et al. _____ 73—250
3,179,193  4/1965  Lindeman et al. ____ 73—113 X

FOREIGN PATENTS 1,240,705  4/1960  France.

CHARLES A. RUEHL, Primary Examiner

U.S. Cl. X.R.

73—434

PO-1050
(5/69)

UNITED STATES PATENT OFFICE
CERTIFICATE OF CORRECTION

Patent No. 3,507,151      Dated April 21, 1970

Inventor(s) Peter Gillingham Williams

It is certified that error appears in the above-identified patent and that said Letters Patent are hereby corrected as shown below:

Column 1, line 21 ", that is" should read -, that is,--;

Column 2, line 33 "16'"should read --16'--;

Column 3, line 26 "fiuid" should read --fluid--; and

Column 3, line 39 "pibot" should read --pivot--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents